US008619120B2

(12) United States Patent
Miyamoto et al.

(10) Patent No.: US 8,619,120 B2
(45) Date of Patent: Dec. 31, 2013

(54) IMAGING APPARATUS, IMAGING METHOD AND RECORDING MEDIUM WITH PROGRAM RECORDED THEREIN

(75) Inventors: Naotomo Miyamoto, Tokyo (JP); Kosuke Matsumoto, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 312 days.

(21) Appl. No.: 13/051,234

(22) Filed: Mar. 18, 2011

(65) Prior Publication Data

US 2011/0228044 A1  Sep. 22, 2011

(30) Foreign Application Priority Data

Mar. 19, 2010 (JP) ................................. 2010-063770

(51) Int. Cl.
*H04N 7/00* (2011.01)
(52) U.S. Cl.
USPC .......................................................... 348/36
(58) Field of Classification Search
USPC ..................... 348/36, 231.99, 222.1
See application file for complete search history.

(56) References Cited

U.S. PATENT DOCUMENTS 6,891,561 B1 * 5/2005 Achituv et al. ................ 348/36
8,314,831 B2 * 11/2012 Morimoto ...................... 348/36
2007/0025723 A1 * 2/2007 Baudisch et al. ............. 396/287
2007/0109398 A1 * 5/2007 Teo ................................. 348/36
2009/0153685 A1 * 6/2009 Son et al. .................. 348/208.99

FOREIGN PATENT DOCUMENTS

| JP | 11-069293 A | 3/1999 |
| JP | 2000-101895 A | 4/2000 |
| JP | 2002-027312 A | 1/2002 |
| JP | 2009-060278 A | 3/2009 |

OTHER PUBLICATIONS

Japanese Office Action dated Feb. 2, 2012 (and English translation thereof) in counterpart Japanese Application No. 2010-063770.

* cited by examiner

*Primary Examiner* — Anner Holder
(74) *Attorney, Agent, or Firm* — Holtz, Holtz, Goodman & Chick, PC

(57) ABSTRACT

An imaging apparatus including a capturing section which captures images, a detection section which detects an image capturing direction of the capturing section, a setting section which sets a plurality of image capturing directions of images for use in a composite necessary to generate a wide-angle image based on a reference image which is a first image captured by the capturing section, a judgment section which judges whether or not the image capturing direction detected by the detection section coincides with any one of the plurality of image capturing directions set by the setting section, and an imaging control section which controls to capture an image for use in the composite by the capturing section in the image capturing direction detected by the detection section, when the judgment section judges that mutual directions coincide.

14 Claims, 8 Drawing Sheets

IMAGING APPARATUS, IMAGING METHOD AND RECORDING MEDIUM WITH PROGRAM RECORDED THEREIN

CROSS-REFERENCE TO RELATED APPLICATION

This application is based upon and claims the benefit of priority from the prior Japanese Patent Application No. 2010-063770, filed Mar. 19, 2010, the entire contents of which is incorporated herein by reference.

BACKGROUND OF THE INVENTION

1. Field of the Invention

The present invention relates to an imaging apparatus, an imaging method, and a recording medium with a program stored therein.

2. Description of the Related Art

In digital cameras, mobile phones having an imaging function, etc., the limit of a viewing angle is dependent on the hardware specification of the device body, such as the focal distance of the lens, the size of the image sensor, and the like. Therefore, a technique is known that, when acquiring a wide-angle image that exceeds a hardware specification, such as when performing panoramic imaging, continuously captures images while moving the imaging apparatus in a certain direction, and generates a wide-angle image by combining the acquired plurality of images (refer to, for example, Japanese Patent Application Laid-Open (Kokai) Publication No. 2002-027312).

However, there is a problem in the above-described conventional technique. Although it is effective when a viewing angle is widen in one direction, a direction in which images should be captured during continuous capture is difficult to know when a wide-angle image that spreads in two directions is to be generated, and accordingly a desired image is difficult to acquire.

An object of the present invention is to provide an imaging apparatus, an imaging method, and a recording medium with a program stored therein by which images necessary to generate a wide-angle image can be easily and efficiently acquired.

SUMMARY OF THE INVENTION

In order to achieve the above-described object, in accordance with one aspect of the present invention, there is provided an imaging apparatus comprising: a capturing section which captures images; a detection section which detects an image capturing direction of the capturing section; a setting section which sets a plurality of image capturing directions of the images for use in a composite necessary to generate a wide-angle image, based on a reference image which is a first image captured by the capturing section; a judgment section which judges whether or not the image capturing direction detected by the detection section coincides with any one of the plurality of image capturing directions set by the setting section; and an imaging control section which controls to capture an image for use in the composite by the capturing section in the image capturing direction detected by the detection section, when the judgment section judges that mutual directions coincide.

In accordance with another aspect of the present invention, there is provided an imaging method for an imaging apparatus including a capturing section that captures images, comprising: a detection step of detecting an image capturing direction of the capturing section; a setting step of setting a plurality of image capturing directions of the images for use in a composite necessary to generate a wide-angle image, based on a reference image which is a first image captured by the capturing section; a judgment step of judging whether or not the image capturing direction detected in the detection step coincides with any one of the plurality of image capturing directions set in the setting step; and an image control step of controlling to capture an image for use in the composite by the capturing section in the image capturing direction detected in the detection step, when the judgment step judges that mutual directions coincide.

In accordance with another aspect of the present invention, there is provided a non-transitory computer-readable storage medium having stored thereon a program that is executable by a computer in an imaging apparatus including a capturing section, the program being executable by the computer to perform a process comprising: detection processing for detecting an image capturing direction of the capturing section; setting processing for setting a plurality of image capturing directions of the images for use in a composite necessary to generate a wide-angle image, based on a reference image which is a first image captured by the capturing section; judgment processing for judging whether or not the image capturing direction detected in the detection processing coincides with any one of the plurality of image capturing directions set in the setting processing; and imaging control processing for controlling to capture an image for use in the composite by the capturing section in the image capturing direction detected in the detection processing, when the judgment processing judges that mutual directions coincide.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The preferred embodiments of the present invention will hereinafter be described with reference to the drawings. However, the scope of the invention is not limited to the illustrated examples.

A. First Embodiment

A-1. Configuration of the First Embodiment

Figure 1:
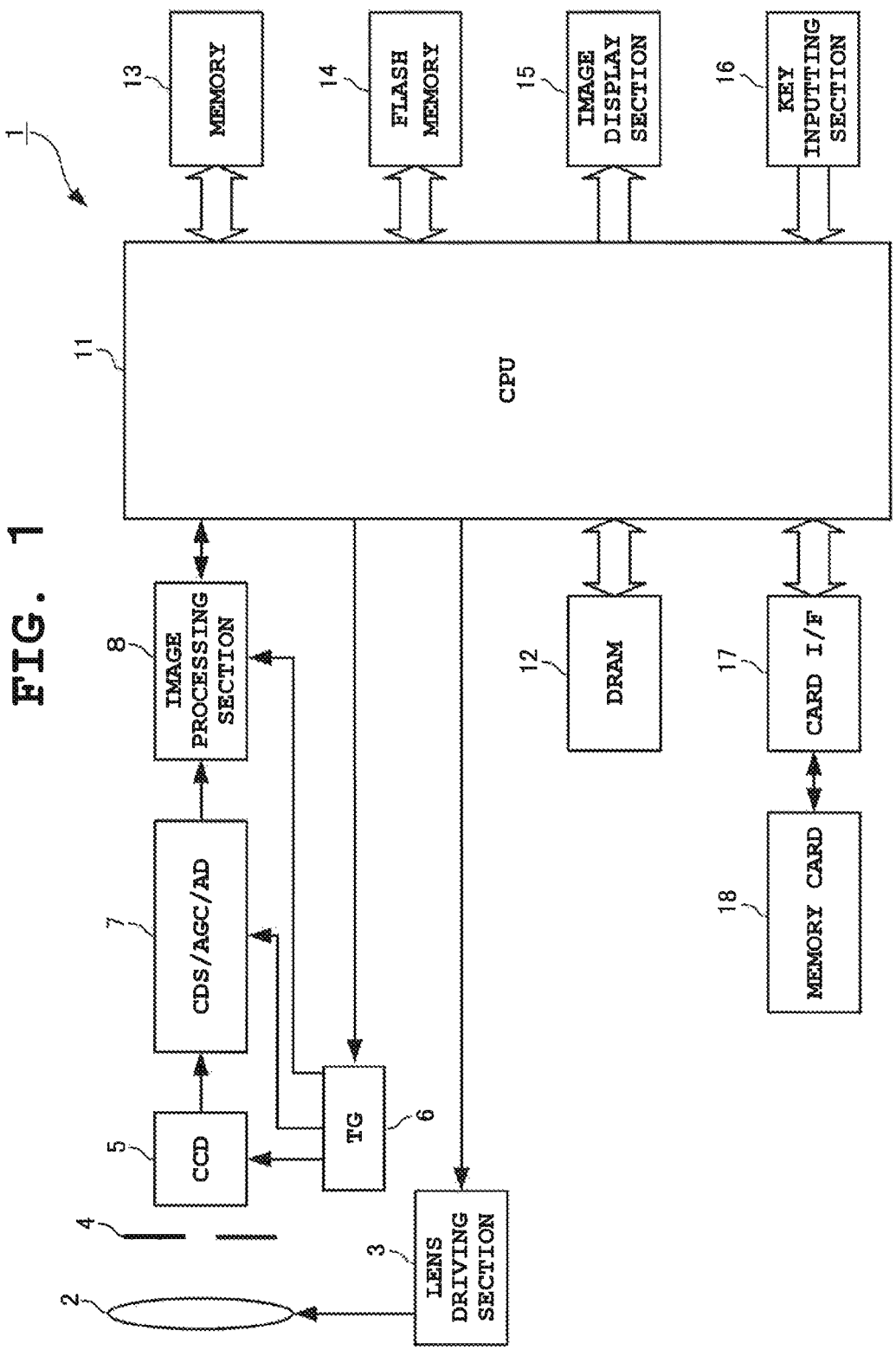
FIG. 1 is a block diagram showing the structure of a digital camera according to a first embodiment of the present invention.

FIG. 1 is a block diagram showing the structure of a digital camera according to a first embodiment of the present invention. In FIG. 1, a digital camera 1 includes an imaging lens 2, a lens driving section 3, a shutter-aperture 4, a charge-coupled device (CCD) 5, a timing generator (TG) 6, a unit circuit 7, an image processing section 8, a central processing unit (CPU) 11, a dynamic random access memory (DRAM) 12, a memory 13, a flash memory 14, an image display section 15, a key inputting section 16, a card interface (I/F) 17, and a memory card 18.

The imaging lens 2 includes a focus lens, a zoom lens, and the like, and is connected with the lens driving section 3. The lens driving section 3 includes a focus motor and a zoom motor that respectively drive the focus lens and the zoom lens constituting the imaging lens 2 in an optical axis direction, and a focus motor driver and a zoom motor driver that drive the focus motor and the zoom motor in accordance with control signals from the CPU 11.

The shutter-aperture 4 includes a driver circuit not shown, and the driver circuit operates the shutter-aperture 4 in accordance with control signals sent from the CPU 11. This shutter-aperture 4 controls the amount of light irradiated from the imaging lens 2. The CCD (image sensor) 5 (capturing section), which is driven in accordance with timing signals of a predetermined frequency generated by the TG 6, converts the light of a subject projected through the imaging lens 2 and the shutter-aperture 4 to electrical signals, and outputs them to the unit circuit 7 as imaging signals.

The unit circuit 7, which is also driven in accordance with timing signals of a predetermined frequency generated by the TG 6, includes a correlated double sampling (CDS) circuit that performs correlated double sampling on imaging signals outputted from the CCD 5 and holds the sampled imaging signals, an automatic gain control (AGC) circuit that performs automatic gain control on the sampled imaging signals, and an analog-to-digital (A/D) converter that converts the automatic-gain-controlled analog imaging signals to digital signals. Imaging signals outputted from the CCD 5 are sent to the image processing section 8 through this unit circuit 7, as digital signals.

The image processing section 8, which is also driven in accordance with timing signals of a predetermined frequency generated by the TG 6, performs image processing of image data sent from the unit circuit 7 (pixel interpolation processing, γ-correction, luminosity color difference signal generation, white balance processing, exposure correction processing, etc.), compression and extension processing of image data (such as compression and extension in Joint Photographic Experts Group (JPEG) format, Motion-JPEG [M-JPEG] format or Moving Picture Experts Group (MPEG) format), processing for combining a plurality of captured images, etc.

The CPU 11 (detection section, setting section, judgment section, imaging control section, first display control section, and second display control section) is a single-chip microcomputer that controls each section of the digital camera 1. In particular, according to the first embodiment, the CPU 11 controls each section such that a plurality of images are continuously captured at a predetermined cycle (time interval), the captured images are combined in a manner such that they are partially overlapped with each other (such as by α-blending), and a single composite image that appears to have been captured at a wide angle is generated. The details of this image for use in a composite will be described hereafter.

The DRAM 12 is used as a buffer memory that temporarily stores image data sent to the CPU 11 after being captured by the CCD 5, and as a working memory of the CPU 11. The memory 13 stores a program necessary for the CPU 11 to control each section of the digital camera 1 and data necessary to control each section, and the CPU 11 performs processing based on this program. The flash memory 14 and the memory card 18 are recording media that store image data captured by the CCD 5 and the like.

The image display section 15 (display section) includes a color liquid crystal display (LCD) and a driver circuit thereof. In an imaging stand-by state, the image display section 15 displays a subject captured by the CCD 5 as a through image. Also, the image display section 15 displays a recorded image that has been read out from the flash memory 14 or the memory card 23 and expanded when it is replayed. In addition, according to the first embodiment, the image display section 15 in the wide-angle imaging mode displays a composite image generated by a plurality of continuously captured images being sequentially combined, a mark that guides the user to an image capturing direction, etc. The key inputting section 16 includes a plurality of operation keys, such as a shutter switch (SW), a zoom SW, a mode key, a SET key, and a cross-shaped key, and outputs operation signals based on key operations by the user to the CPU 11. The memory card 18 is detachably mounted on the card I/F 17 by a card slot (not shown) in the main body of the digital camera 1.

Figure 2:
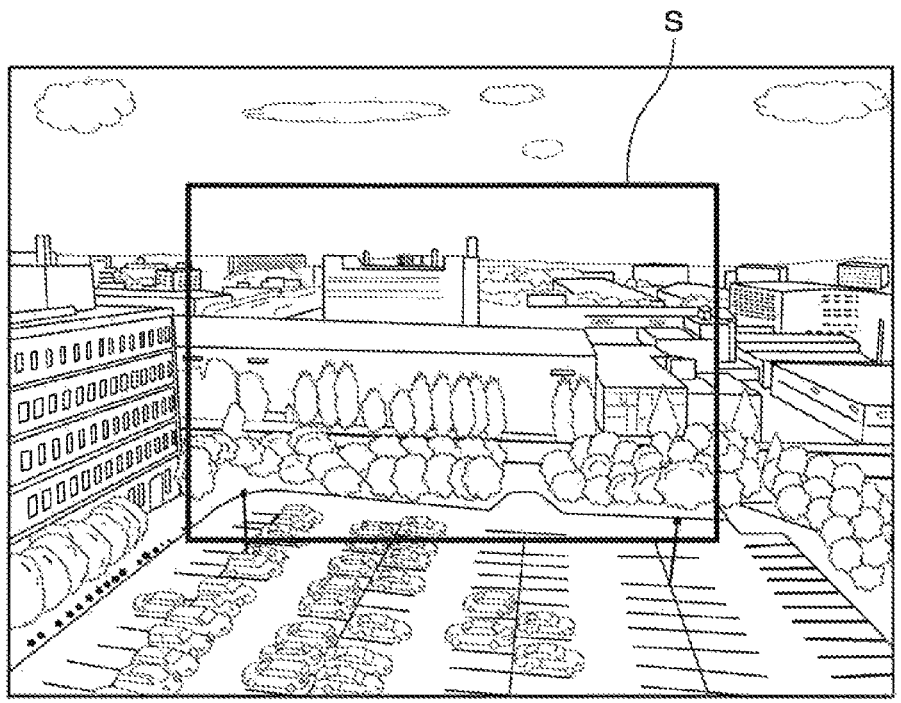
FIG. 2 is a conceptual diagram for explaining a wide-angle imaging mode of a digital camera 1 according to the first embodiment.

FIG. 2 is a conceptual diagram for explaining the wide-angle imaging mode of the digital camera 1 according to the first embodiment. For example, suppose the case where a landscape such as that shown in FIG. 2 is to be captured by the digital camera 1. A viewing angle that is wider than a viewing angle S of the imaging system of the digital camera 1 is required to capture the landscape of the desired area. Accordingly, in this case, the entire desired landscape cannot be captured by a single shot.

Figure 3:
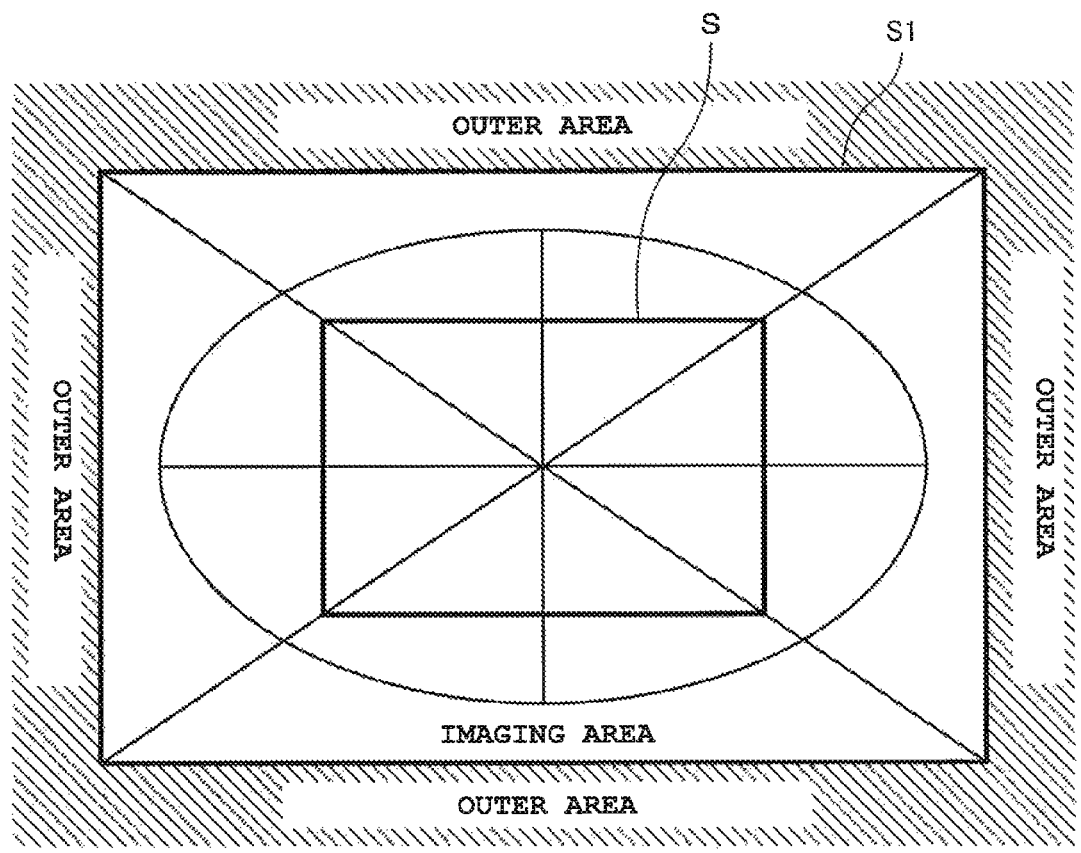
FIG. 3 is a conceptual diagram showing a relationship between the viewing angle of a lens and a composite image acquired in the wide-angle imaging mode in the digital camera 1 according to the first embodiment.

In the description below, the landscape shown in FIG. 2 will be described, being schematized as shown in FIG. 3 to clarify the imaging area, the viewing angle for imaging, etc. In FIG. 3, a viewing angle S1 is the size (viewing angle) of an image with a wide viewing angle ultimately generated. Even if the outer side is captured, this outer area is not saved in the final image.

In the first embodiment, an array for writing an image is secured in the memory (DRAM 12). This array is referred to as a canvas for convenience. The canvas indicates an imaging area that is produced by a generated composite image with a wide viewing angle. That is, a plurality of captured images that are positioned in a manner to be partially overlapped with each other and combined overwrite the canvas. Then, the area on the canvas in which the image has been written is extracted from the composite image, whereby an image with a wide viewing angle is generated.

In the first embodiment, with a first image captured in the wide-angle imaging mode serving as a reference image (equivalent to the image at the viewing angle S in FIG. 3), an area that is, for example, twice the height and twice the width of the reference image is set as the canvas (the imaging area S1 in FIG. 3). Then, the reference image is pasted in the center of the canvas. Note that the size of the canvas may be other than twice the height and width.

Also note that the reference image is not necessarily required to be placed in the center of the canvas and, for example, may be placed in the upper-left corner, the upper-right corner, etc. Next, a plurality of captured images are positioned in a manner to be partially overlapped with the reference image (or composite image) and combined therewith. Then the canvas is overwritten by the combined image. Block matching, for example, can be used as a method for the positioning. In addition, a method can be used in which projection conversion or the like is performed and the images are overlapped using a technique such as α-blending, as a method to overwrite the canvas.

Figure 4:
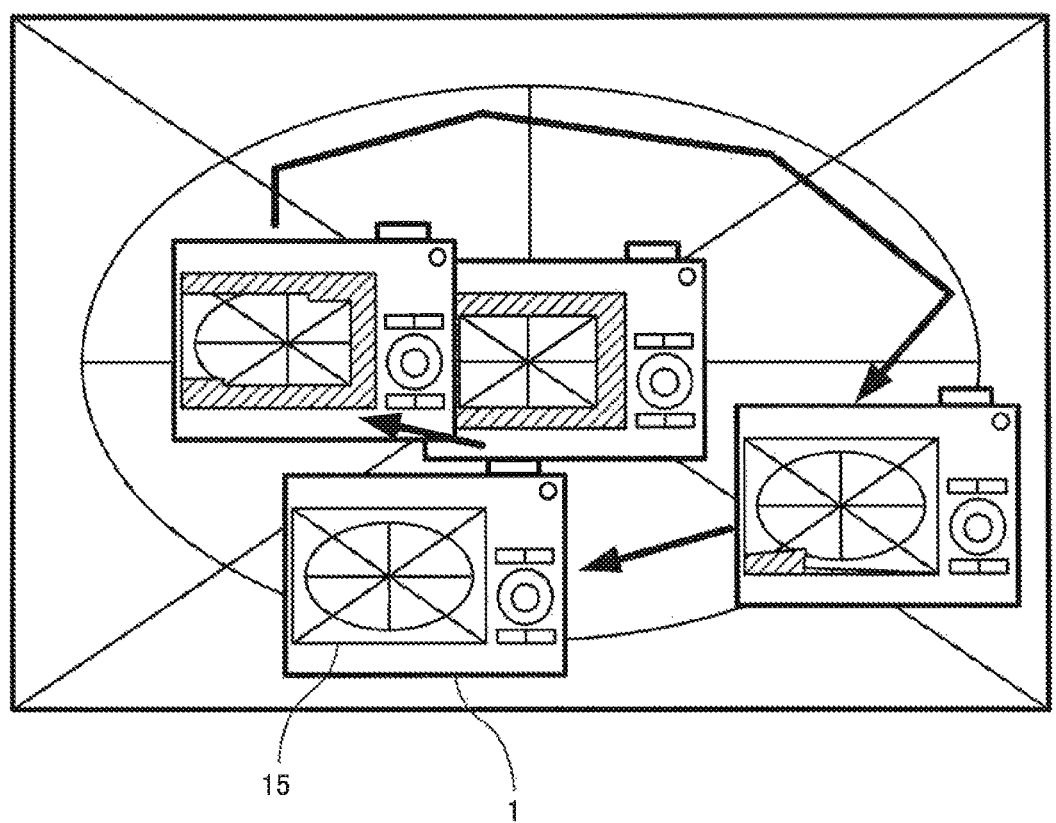
FIG. 4 is a schematic diagram for explaining user operation in the wide-angle imaging mode of the digital camera 1 according to the first embodiment.

FIG. 4 is a schematic diagram for explaining user operation in wide-angle imaging mode of the digital camera 1 according to the first embodiment. When the user points the digital camera 1 at, for example, the center area of the desired landscape and depresses (half-depression→full depression) the shutter SW, the digital camera 1 captures images for acquiring a composite image with a wide viewing angle at a predetermined timing. In order to capture all images necessary to acquire a composite image with a wide viewing angle, the user is required to move the digital camera 1 in a circular motion to change the image capturing direction of the digital camera 1, as indicated by the arrow in FIG. 4. However, it is hard for the user to know how to move the digital camera 1 or whether or not the necessary images are being taken without fail.

Therefore, in the first embodiment, when the user depresses the shutter SW in the wide-angle imaging mode, the user is guided by a mark indicating a direction in which the digital camera 1 should be pointed being displayed on the image display section 15. Then, when the digital camera 1 detects that the user has pointed the image capturing direction of the digital camera 1 in a direction indicated by the mark, the digital camera 1 sequentially captures images at this timing and acquires a plurality of images necessary to generate an image with a wide viewing angle that cannot be acquired by a single shot.

More specifically, based on a first captured image (reference image), a mark indicating an image capturing direction for the second and subsequent images necessary to generate an image with a wide viewing angle is displayed on the image display section 15. Then, when the image capturing direction of the digital camera 1 is pointed in a direction indicated by the mark, an image (high-quality image) for acquiring an image with a wide viewing angle is captured. Every time an image is captured, the mark is moved in the next image capturing direction and displayed, and as a result, images (high-quality image) for acquiring an image with a wide viewing angle are sequentially captured. Accordingly, in the first embodiment, all that is required for acquiring an image with a wide viewing angle is to capture a minimum required number of images, and therefore its memory capacity for storing images can be efficiently used without being overloaded.

Additionally, in the wide-angle imaging mode, an image formed in the CCD 5 showing a view in the current image capturing direction of the digital camera 1 is displayed on the image display section 15 in live view as a preview image (low resolution). Also, a composite image generated using preview images is displayed on the image display section 15. When the capturing of all images (high-quality images) for acquiring an image with a wide viewing angle is completed, ultimately, these captured images (high-quality images) are combined such that the same areas substantially coincide, and a composite image with a wide viewing angle is generated. As just described, in the wide-angle imaging mode, a composite image that has been reduced in size and a mark indicating an image capturing direction in which the next image should be captured are displayed on the image display section 15. Thus, the user can easily confirm a direction in which the digital camera 1 should be pointed.

A-2. Operations of the First Embodiment

Next, operations of the above-described first embodiment will be described.

Figure 5:
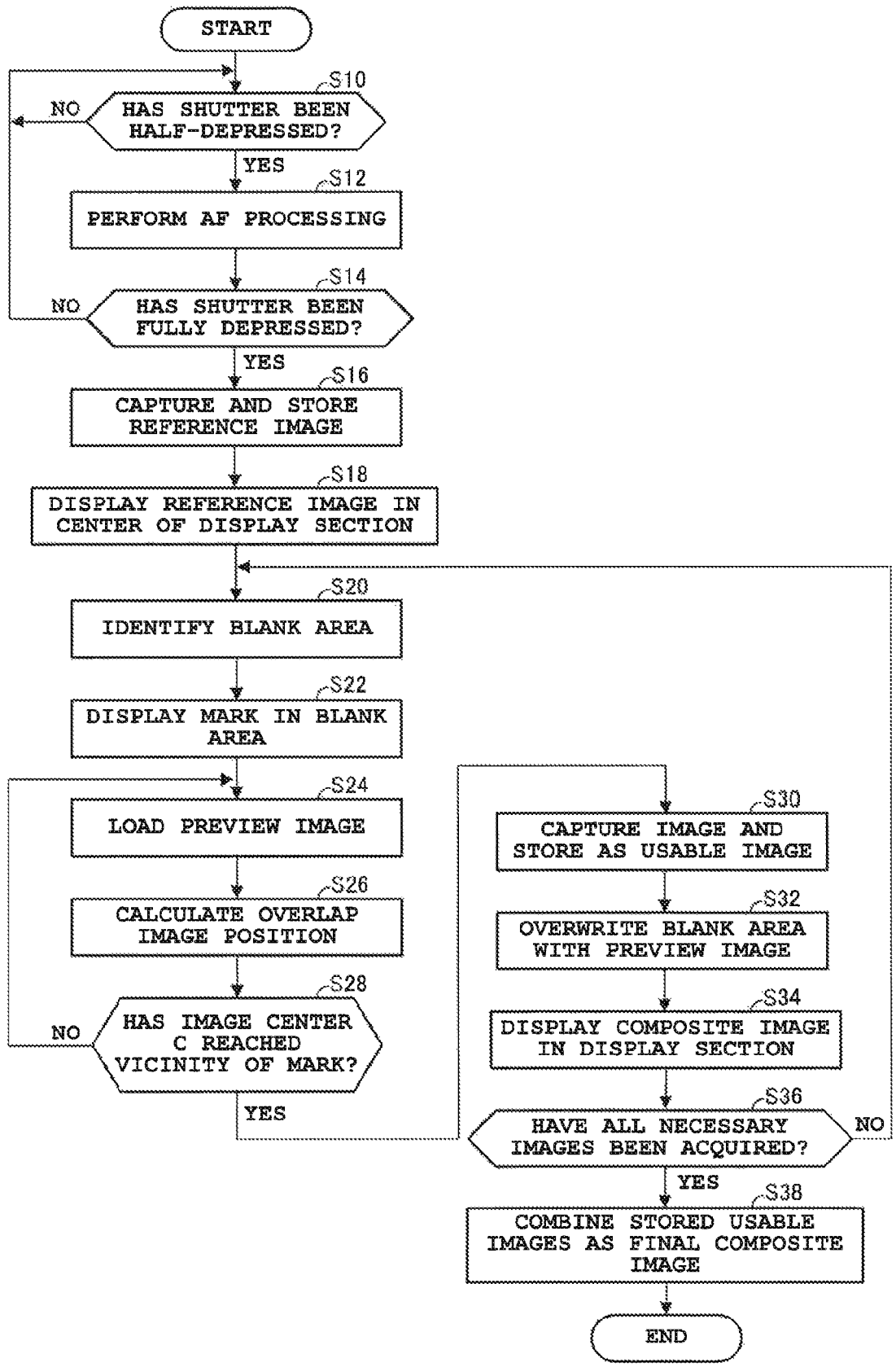
FIG. 5 is a flowchart for explaining operations of the digital camera according to the first embodiment.

FIG. 5 is a flowchart for explaining operations of the digital camera 1 of the first embodiment. FIG. 6A to FIG. 6D are schematic diagrams showing operations of the digital camera 1 of the first embodiment and display examples of the image display section 15. While the processing described hereafter is running, the digital camera 1 loads images formed in the CCD 5 at predetermined time intervals (several tens of frames per second) and displays the images on the image display section 15 in live view as preview images (low resolution).

Regarding the display position of a preview image in the image display section 15, in ordinary imaging, the center of the image display section 15 and the center of the preview image are aligned (a photographic subject in an image capturing direction is displayed in the center of the image display section). However, in the wide-angle imaging mode of the first embodiment, the position of a preview image on the screen of the image display section 15 is moved according to the image capturing direction of the digital camera 1, with reference to the capturing position of the reference image.

For example, after capturing a reference image, when the user moves the image capturing direction of the digital camera 1 in the right-hand direction (relative to the capturing position of the reference image), the preview image also moves on the screen of the image display section 15 in the right-hand direction relative to the reference image. Conversely, when the user moves the image capturing direction in the left-hand direction, the preview image also moves in the left-hand direction relative to the reference image. The same applies to when the image capturing direction is moved in the upward or downward direction. Hereafter, the imaging and the generation of an image with a wide viewing angle will be described with the view of the positional control of a preview image such as this.

First, the CPU 11 judges whether or not the shutter SW has been half-depressed (Step S10). When judged that the shutter SW has not been half-depressed, the CPU 11 repeatedly performs Step S10. Conversely, when judged that the shutter SW has been half-depressed, the CPU 11 performs auto-focus (AF) processing (Step S12) and judges whether or not the shutter SW has been fully depressed (Step S14). When judged that the shutter SW has not been fully depressed, the CPU 11 repeatedly performs Step S10 and Step S12.

Figure 6A:
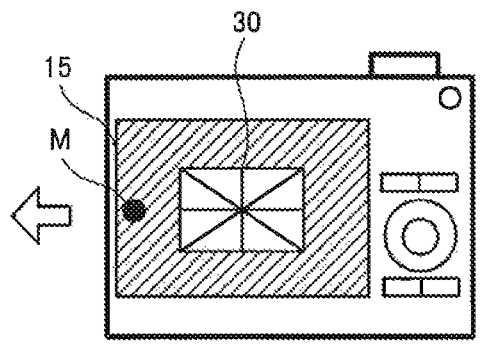
FIG. 6A to FIG. 6D are schematic diagrams showing the operations of the digital camera according to the first embodiment and display examples of an image display section.
Figure 6B:
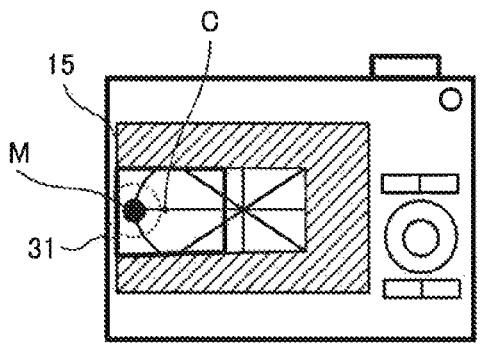

Conversely, when judged that the shutter SW has been fully depressed, the CPU 11 first captures a first image (high resolution) as a reference image 30 and stores the captured image in the DRAM 12 (Step S16). Then, as shown in FIG. 6A, the CPU 11 displays a preview image of the reference image 30 in the center of the image display section 15 (Step S18). Next, the CPU 11 identifies a blank area that is an area that has not yet been captured based on the reference image 30 (Step S20), and displays a mark M indicating an image capturing direction in a first blank area on the image display section 15 (Step S22). When the user confirms the mark M, he moves the digital camera 1 to point the image capturing direction of the digital camera 1 in the direction of the mark M. When the user moves the image capturing direction in the left-hand direction aiming at the mark M, a preview image 31 also moves in the left-hand direction relative to the reference image 30, as shown in FIG. 6B.

Next, in the digital camera 1, the CPU 11 loads the preview image (Step S24) and calculates an overlap image position therefor (Step S26). The calculation of an overlap image position refers to, for example, calculating the center position (coordinates) of a preview image, positioning the preview image and the reference image (or composite image) to partially overlap, and calculating the position of the preview image within the canvas (or a relative position to the reference image), etc.

Next, based on a center position C of the preview image 31 and the position within the canvas, the CPU 11 judges whether or not the center position C of the preview image 31 has reached the vicinity of the mark M (Step S28). When judged that the center position C of the preview image 31 has not reached the vicinity of the mark M, the CPU 11 returns to Step S24 and repeats the same processing on the next preview image.

Figure 6C:
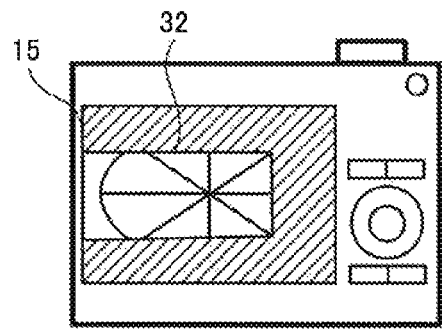

Conversely, when judged that the center position C of the preview image 31 has reached the vicinity of the mark M, the CPU 11 captures the image (high-quality) and stores the image in the DRAM 12 as a usable image (Step S30). Then, the CPU 11 overwrites the blank area in which the mark M has been displayed with the preview image 31 (Step S32). That is, the preview image and the reference image (or composite image) are combined in a manner to be partially overlapped with each other, and the canvas is overwritten with the composite image (when the image is a first captured image, the center portion of the canvas is overwritten with the image as a reference image). In the example shown in FIG. 6B, since the center position C of the preview image 31 has reached the vicinity of the mark M, the preview image 31 and the reference image 30 are combined in a manner to be partially overlapped, and a composite image 32 is displayed on the image display section 15 (Step S34) as shown in FIG. 6C.

Figure 6D:
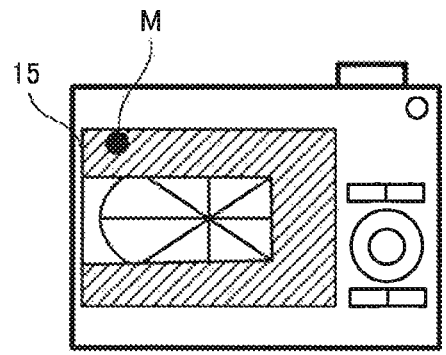

Next, the CPU 11 judges whether or not all images necessary to generate an image with a wide viewing angle have been acquired (Step S36). When judged that not all of necessary images have been acquired, the CPU 11 returns to Step S20. Then, as shown in FIG. 6D, the CPU 11 identifies the next blank area, and after displaying the mark M in this next blank area, repeats the same processing on the loaded preview image. As a result, every time an image is captured, the mark M is displayed in the next blank area, and when the user points the image capturing direction of the digital camera 1 in the direction of the mark M, and the center position C of the preview image 31 at this time reaches the vicinity of the mark M, the image (high resolution) is captured and stored as a usable image. Preview images of images acquired as above are combined with the reference image (or composite image) in sequential order, and every time it is performed, a composite image generated thereby is displayed on the image display section 15.

When all necessary images are acquired, the CPU 11 positions and combines the stored usable images in a manner that they are partially overlapped, as in the case of the image composition performed using preview images. Consequently, an image with a wide viewing angle such as that shown in FIG. 2 is generated (Step S38).

According to the above-described first embodiment, a composite image is displayed on the image display section 15 and a mark is displayed in a blank area that has not yet been captured corresponding to an image capturing direction in which the digital camera 1 should be pointed, in real time. As a result, the user is only required to move the digital camera 1 to follow the mark M. Therefore, a plurality of images necessary to generate an image with a wide viewing angle which are unobtainable by a single shot can be easily and efficiently captured, and an image with a wide viewing angle can be easily generated.

In addition, only usable high-resolution images for generating an image with a wide viewing angle are captured and stored only when the digital camera 1 is pointed in the directions of blank areas that have not yet been captured, or in other words, only when the center position of a preview image reaches the vicinity of the mark M. Therefore, its memory capacity can be efficiently used without being overloaded.

B. Second Embodiment

Next, a second embodiment of the present invention will be described.

According to the second embodiment, once a reference image is captured, the blank area of the canvas is divided into a plurality of areas, and a plurality of marks (such as white marks) are each displayed in advance in a predetermined position in each area on the image display section 15. Then, a mark (such as a yellow mark) indicating a center position is displayed in the center of a preview image in a direction in which the digital camera 1 has been pointed. The user sequentially moves the digital camera 1 to move the yellow mark indicating the center of the preview image towards the white marks. As a result, usable images (high-quality) necessary to generate an image with a wide viewing angle are sequentially captured and stored. Note that the structure of the digital camera 1 is similar to that of the first embodiment, and therefore explanation thereof is omitted.

Figure 7:
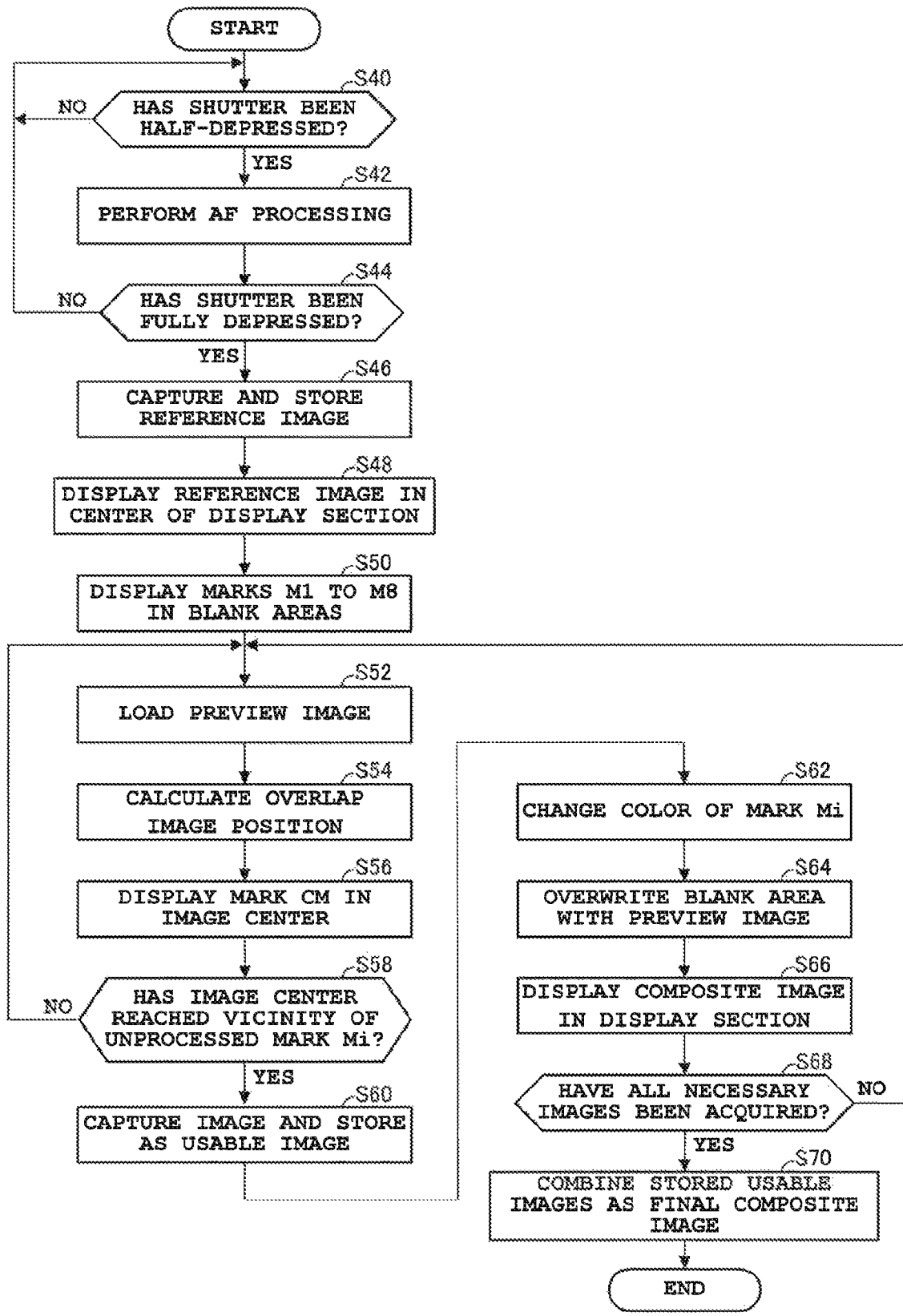
FIG. 7 is a flowchart for explaining operations of a digital camera according to a second embodiment.

FIG. 7 is a flowchart for explaining operations of the digital camera 1 according to the second embodiment. FIG. 8A to FIG. 8D are schematic diagrams showing the operations of the digital camera 1 according to the second embodiment and display examples of the image display section 15.

First, the CPU 11 judges whether or not the shutter SW has been half-depressed (Step S40). When judged that the shutter SW has not been half-depressed, the CPU 11 repeatedly performs Step S40. Conversely, when judged that the shutter SW has been half-depressed, the CPU 11 performs AF processing (Step S42) and judges whether or not the shutter SW has been fully depressed (Step S44). When judged that the shutter SW has not been fully depressed, the CPU 11 repeatedly performs Step S40 and Step S42.

Figure 8A:
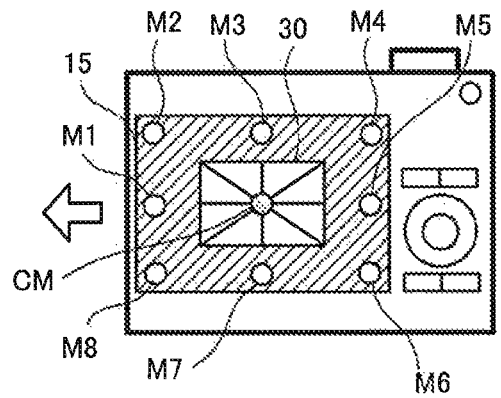
FIG. 8A to FIG. 8D are schematic diagrams showing the operations of the digital camera according to the second embodiment and display examples of an image display section.

Conversely, when judged that the switch SW has been fully depressed, the CPU 11 first captures a first image (high resolution) as a reference image 30 and stores the captured image in the DRAM 12 (Step S46). As shown in FIG. 8A, the CPU 11 displays a preview image of the reference image 30 in the center of the image display section 15 (Step S48). Next, the CPU 11 displays marks M1 to M8 (such as white marks) indicating image capturing directions in blank areas that are areas present in the circumference of the reference image 30 which have not yet been captured (Step S50).

The display positions of the marks M1 to M8 are positions of the centers of the second and subsequently captured images relative to the center of the reference image 30 that has been captured first, and are ideal positions for generating an image with a wide viewing angle. That is, the canvas, whose size is the final viewing angle size, is divided into a plurality of areas based on the viewing angle of the reference image 30, and the marks M1 to M8 are each displayed in a position ideal for generating an image with a wide viewing angle in each area.

Next, the CPU 11 loads the preview image (Step S52) and calculates an overlap image position thereof (Step S54). The calculation of an overlap image position refers to, for example, calculating the center position (coordinates) of a preview image, positioning the preview image and the reference image (or composite image) to partially overlap, and calculating the position of the preview image within the canvas (or a relative position to the reference image), etc.

Figure 8B:
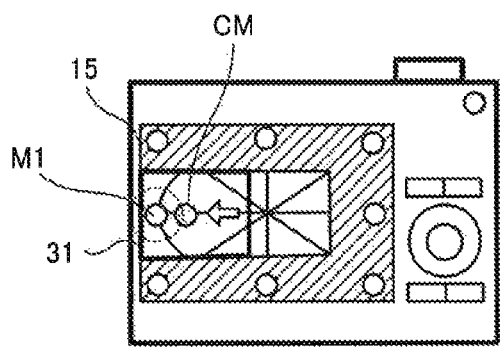

Next, as shown in FIG. 8A, a mark (such as a yellow mark) CM is displayed in the center of the reference image 30 (Step S56). When the user confirms the marks M1 to M8, he moves the digital camera 1 to point the image capturing direction of the digital camera 1 in the direction of, for example, the mark M1. When the user moves the image capturing direction in the left-hand direction aiming at the mark M1, the preview image 31 also moves in the left-hand direction relative to the reference image 30, as shown in FIG. 8B.

Next, the CPU 11 judges whether or not the center position of the preview image 31 has reached the vicinity of the mark Mi (i=1 to 8) (Step S58). When judged that the center position of the preview image 31 has not reached the vicinity of the mark Mi, the CPU 11 returns to Step S52 and repeatedly performs the same processing on the next preview image 31. That is, the preview image 31 having the mark CM displayed in its center moves on the screen of the image display section 15, along with the movement of the digital camera 1 by the user.

Conversely, when judged that the center position of the preview image 31 has reached the vicinity of the mark Mi, the CPU 11 captures the image (high-quality) and stores the image in the DRAM 12 as a usable image (Step S60). Next, as shown in FIG. 8B, the CPU 11 changes the color of the mark Mi to green (Step S62), and overwrites the blank area in which the mark Mi has been displayed with the preview image (Step S64). That is, the preview image and the reference image (or composite image) are combined in a manner to be partially overlapped with each other, and the canvas is overwritten with the composite image (when the image is a first captured image, the center portion of the canvas is overwritten with the image as a reference image). Next, as shown in FIG. 8C, the composite image 32 is displayed on the image display section 15 (Step S66).

Next, the CPU 11 judges whether or not all images necessary to generate an image with a wide viewing angle have been acquired (Step S68). When judged that not all of necessary images have been acquired, the CPU 11 returns to Step S52 and repeats the same processing on the next preview image.

Figure 8C:
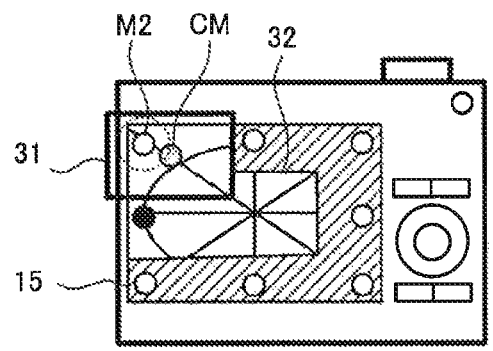
Figure 8D:
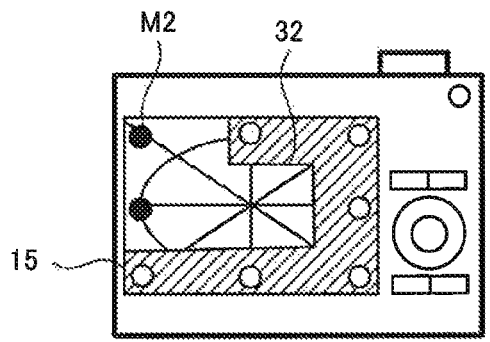

That is, when the color of the mark Mi changes to green, the user moves the digital camera 1 (changes the image capturing direction) such that the mark CM indicating the center of the preview image 31 approaches the mark M2, as shown in FIG. 8C. Then, when the center position of the preview image 31 reaches the vicinity of the mark M2, the image (high resolution) is stored as a usable image, and the color of the mark M2 is changed as shown in FIG. 8D. Preview images of images acquired as above are combined with the reference image (or composite image) in sequential order, and every time it is performed, a composite image generated thereby is displayed on the image display section 15. This operation is repeated until the color of all marks M1 to M8 are changed to green. The user is only required to move the digital camera 1 to follow the marks M1 to M8 displayed on the image display section 15.

Then, when all necessary images are acquired, the CPU 11 positions and combines the stored usable images in a manner that they are partially overlapped, as in the case of the image composition performed using preview images. Consequently, an image with a wide viewing angle such as that shown in FIG. 2 is generated (Step S70).

According to the above-described second embodiment, a composite image is displayed on the image display section 15 and marks are displayed in blank areas that have not yet been captured corresponding to image capturing directions in which the digital camera 1 should be pointed, in real time. In addition, marks indicating areas that have already been captured and marks indicating areas that have not yet been captured are displayed in different colors. As a result, the user can easily know a direction in which the digital camera 1 should be pointed next, whereby images necessary to generate an image with a wide viewing angle unobtainable by a single shot can be easily and efficiently captured, and an image with a wide viewing angle can be easily and efficiently generated.

In addition, only usable high-resolution images for generating an image with a wide viewing angle are captured and stored only when the digital camera 1 is pointed in the directions of blank areas that have not yet been captured, or in other words, only when the center position of a preview image reaches the vicinity of the mark M. Therefore, its memory capacity can be efficiently used without being overloaded.

In the above-described first and second embodiments, the movement of the digital camera 1 (changing of an image capturing direction) is judged based on the relative positional relationship of a preview image to the reference image. However, in addition thereto, a sensor section such as an acceleration sensor that is capable of directly detecting the movement of the digital camera 1 may be used to assist the judgment. Through the use of a sensor section such as this, particularly when a subject whose position in a preview image cannot be accurately acquired, such as a subject not having characteristics in terms of contrast, is being captured, the position of the preview image relative to the reference image can be identified based on the movement of the digital camera 1 detected by the acceleration sensor.

In addition, the colors of marks indicating image capturing directions are not limited to those described above. These marks may be accompanied by visual effects such as flashing, and may be of a shape other than a dot, such as a star or a heart. In particular, after an image is captured as a usable image, the shape of the mark may be changed rather than the color of the mark being changed, or alternatively the mark may be deleted.

Moreover, in the above-described embodiments, a digital camera is described as the imaging apparatus. However, the present invention is not limited thereto, and is applicable to any electronic device having an imaging function, such as a mobile phone. In addition, a configuration may be used in which the present invention is actualized by the CPU 11 running a predetermined program stored in a program memory (not shown).

While the present invention has been described with reference to the preferred embodiments, it is intended that the invention be not limited by any of the details of the description therein but includes all the embodiments which fall within the scope of the appended claims.

What is claimed is:
1. An imaging apparatus comprising:
   a capturing section which captures images;
   a first display control section which controls a display to display a live-view image and at least one mark guiding a user to at least a first image capturing direction for capturing one of a plurality of images to be used to create a composite image;

an image acquiring section which acquires an image which is captured in the first image capturing direction, as one of the plurality of images to be used to create the composite image; and a changing section which changes an aspect of the at least one mark so that the mark notifies the user of at least a second image capturing direction for capturing another image to be used to create the composite image, when the image acquiring section acquires the image captured in the first image capturing direction, wherein the second image capturing direction is different from the first image capturing direction.

2. The imaging apparatus according to claim 1, wherein the first display control section controls the display to display one mark, and the changing section moves the mark to a position indicating another image capturing direction every time the image acquiring section acquires an image in an image capturing direction notified by the mark.

3. The imaging apparatus according to claim 1, wherein the first display control section controls the display to display a plurality of marks indicating a plurality of image capturing directions including the first image capturing direction and the second image capturing direction; and wherein the changing section changes an aspect of one of the plurality of the marks corresponding to a current image capturing direction when the image acquiring section acquires an image in the current image capturing direction.

4. The imaging apparatus according to claim 1, wherein the first display control section controls the display section to sequentially display images loaded from the capturing section in a position corresponding to a current image capturing direction, as the live-view image.

5. The imaging apparatus according to claim 4, further comprising:

a calculation section which calculates a center position of the live-view image; and a judgment section which judges whether the center position of the live-view image substantially matches a position of the mark;

wherein the image acquiring section acquires an image in the current image capturing direction from the captured images when the judgment section judges that the center position of the live-view image substantially matches the position of the mark.

6. The imaging apparatus according to claim 5, further comprising:

a second display control section which controls the display section to display a center mark indicating the center position of the live-view image.

7. The imaging apparatus according to claim 1, wherein the capturing section captures the image at a first viewing angle, and wherein the imaging apparatus further includes a generation section which generates the composite image to have a second viewing angle that is wider than the first viewing angle by combining a plurality of images acquired by the image acquiring section.

8. The imaging apparatus according to claim 1, further comprising:

a judgment section which judges whether a position of the mark and a position of the live-view image substantially match each other;

wherein the changing section changes the aspect of the mark so that the mark notifies the user of a new image capturing direction when the judgment section judges that the position of the mark and the position of the live-view image substantially match each other.

9. The imaging apparatus according to claim 1, wherein the first display control section controls the display to simultaneously display the live-view image, the at least one mark, and a composite range corresponding to a range of the composite image, which is larger than a range of each of the captured images.

10. The imaging apparatus according to claim 9, wherein the composite range includes a first area for which image data has been acquired by the image acquiring section, and a second area for which image data has not been acquired by the image acquiring section; and wherein the first display control section controls the display to display one mark, and the first display control section and the changing section perform control to display the mark in the second area.

11. The imaging apparatus according to claim 1, further comprising:

a detection section which detects an image capturing direction of the capturing section; and an imaging control section which controls the image acquiring section to acquire the image captured in the first image capturing direction when the detected image capturing direction matches the first image capturing direction.

12. The imaging apparatus according to claim 1, wherein the changing section changes a color of the mark corresponding to the first image capturing direction when the image acquiring unit acquires the image captured in the first image capturing direction.

13. An imaging method for an imaging apparatus including a capturing section that captures images, comprising:

controlling a display to display a live-view image and at least one mark guiding a user to at least a first image capturing direction for capturing one of a plurality of images to be used to create a composite image;

acquiring an image which is captured in the first image capturing direction, as one of the plurality of images to be used to create the composite image; and changing an aspect of the at least one mark so that the mark notifies the user of at least a second image capturing direction for capturing another image to be used to create the composite image, when the image captured in the first image capturing direction is acquired, wherein the second image capturing direction is different from the first image capturing direction.

14. A non-transitory computer-readable storage medium having stored thereon a program that is executable by a computer in an imaging apparatus including a capturing section that captures images, the program being executable by the computer to perform a process comprising:

controlling a display to display a live-view image and at least one mark guiding a user to at least a first image capturing direction for capturing one of a plurality of images to be used to create a composite image;

acquiring an image which is captured in the first image capturing direction, as one of the plurality of images to be used to create the composite image; and changing an aspect of the at least one mark so that the mark notifies the user of at least a second image capturing direction for capturing another image to be used to create the composite image, when the image captured in the first image capturing direction is acquired, wherein the second image capturing direction is different from the first image capturing direction.

\* \* \* \* \*